L. A. PAYTON.
WIND WHEEL.
APPLICATION FILED FEB. 24, 1913.

1,093,881.

Patented Apr. 21, 1914.

3 SHEETS—SHEET 1.

Witnesses
Frank R Glow

Inventor
L. A. Payton
By George F Thorp Atty.

L. A. PAYTON.
WIND WHEEL.
APPLICATION FILED FEB. 24, 1913.

1,093,881.

Patented Apr. 21, 1914.

3 SHEETS—SHEET 2.

Witnesses
Frank R Glow

Inventor
L. A. Payton
By George␣␣Thorpe Atty.

L. A. PAYTON.
WIND WHEEL.
APPLICATION FILED FEB. 24, 1913.
1,093,881.
Patented Apr. 21, 1914.
3 SHEETS—SHEET 3.
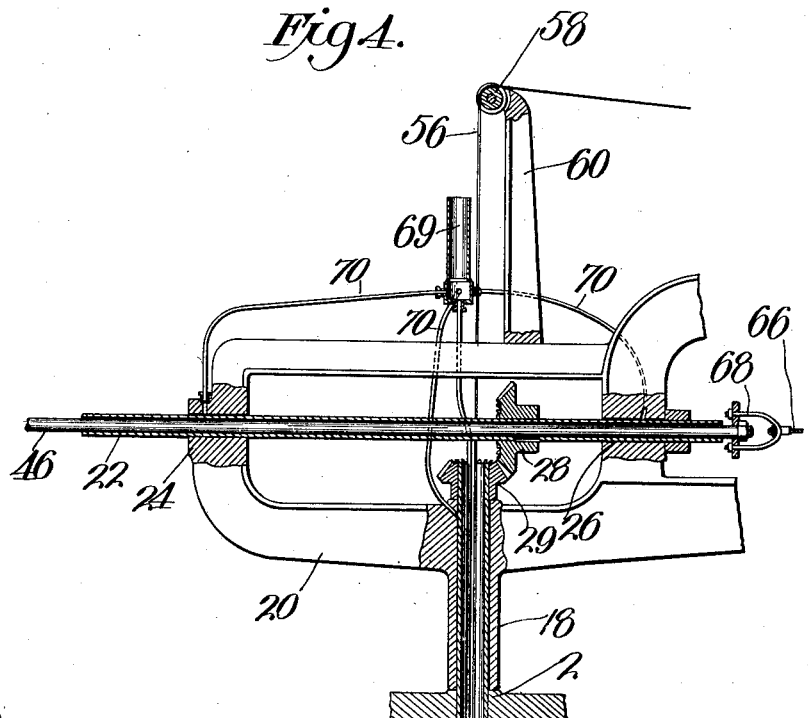
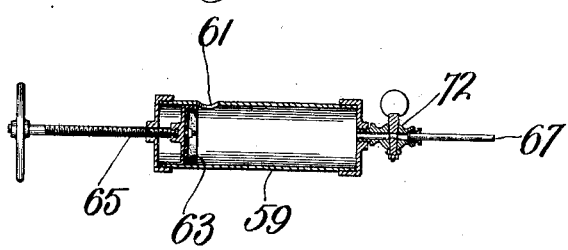
Witnesses
Frank R Glow
Inventor
L. A. Payton
By George ... Atty.

UNITED STATES PATENT OFFICE.

LEWIS A. PAYTON, OF ELLENDALE, OKLAHOMA.

WIND-WHEEL.

1,093,881.

Specification of Letters Patent.

Patented Apr. 21, 1914.

Application filed February 24, 1913. Serial No. 750,156.

*To all whom it may concern:*

Be it known that I, LEWIS A. PAYTON, a citizen of the United States, residing at Ellendale, in the county of Woodward and State of Oklahoma, have invented certain new and useful Improvements in Wind-Wheels, of which the following is a specification.

My invention relates to wind wheels and one of my objects is to provide a wind wheel having its blades mounted on tilting or oscillating sections, the degree of tilting of which may be readily regulated to accommodate for varying degrees of wind pressure and also to provide an improved construction of blade mounting for the oscillating sections of the wheel.

Another object is to produce a construction which may dispense with the usual vane and in which the bearings are provided with means of lubrication and a convenient means for maintaining a supply of lubricant from the base of the tower.

With these and further objects in view, as will appear as the description proceeds, my invention consists in the various parts and combinations as set forth in the following description of one of the forms thereof, for a full understanding of which reference is to be had to the accompanying drawings in which—

Figure 1:
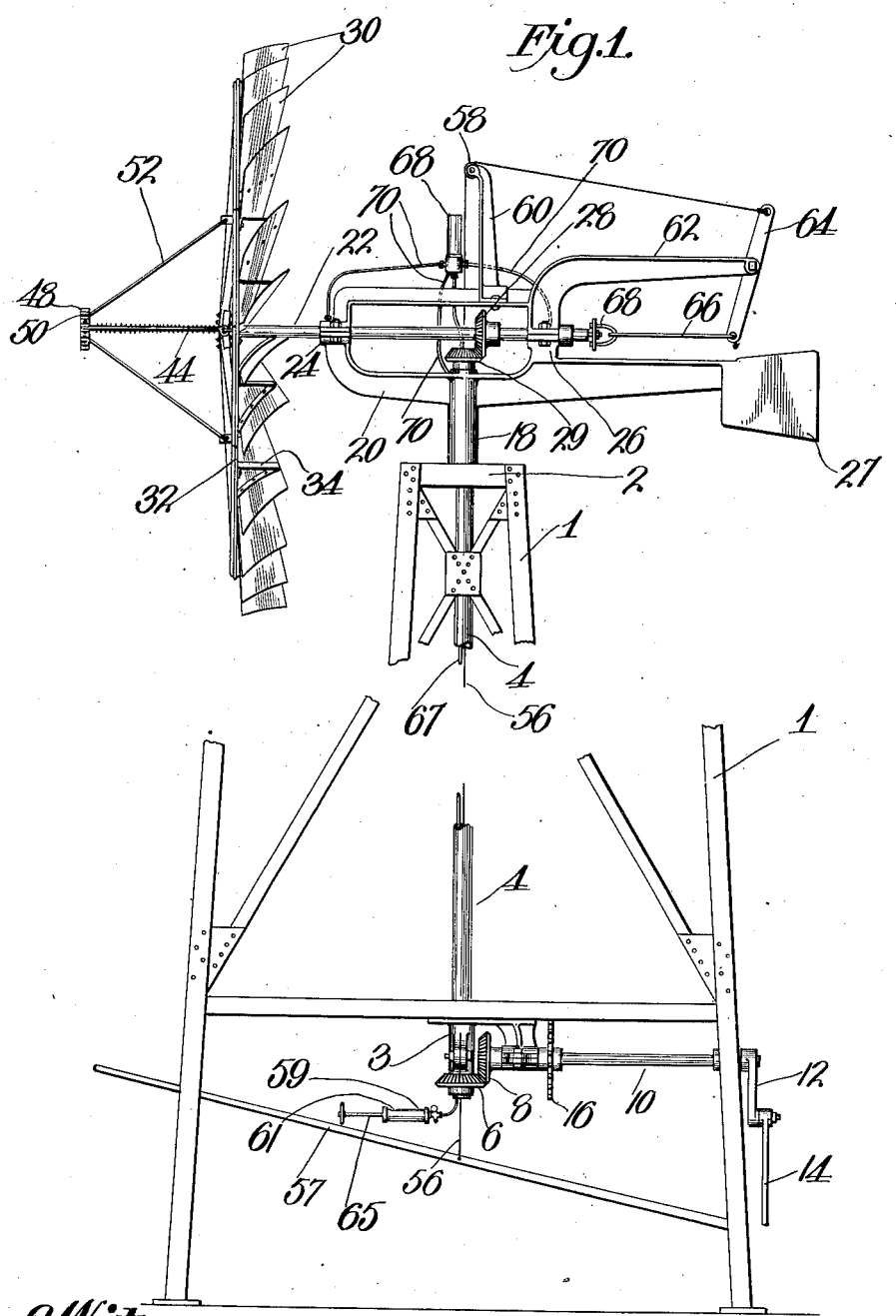
Figure 2:
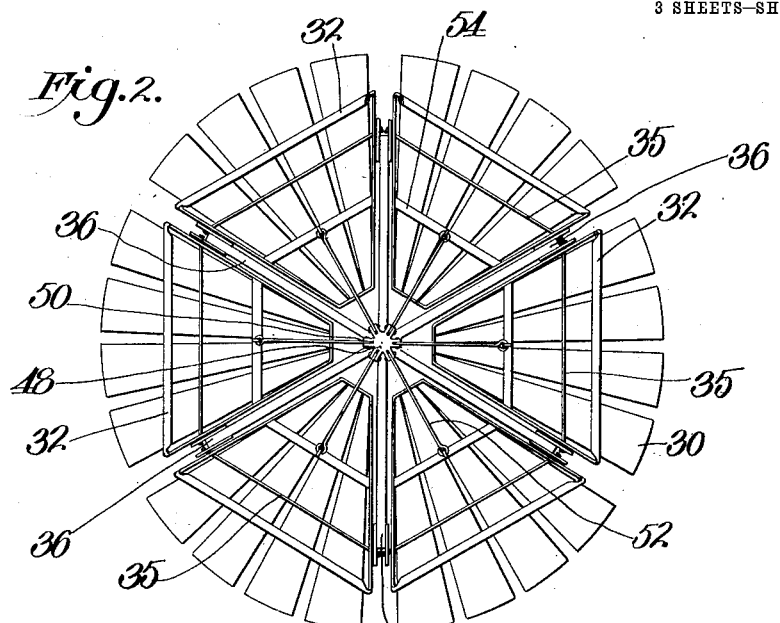
Figure 3:
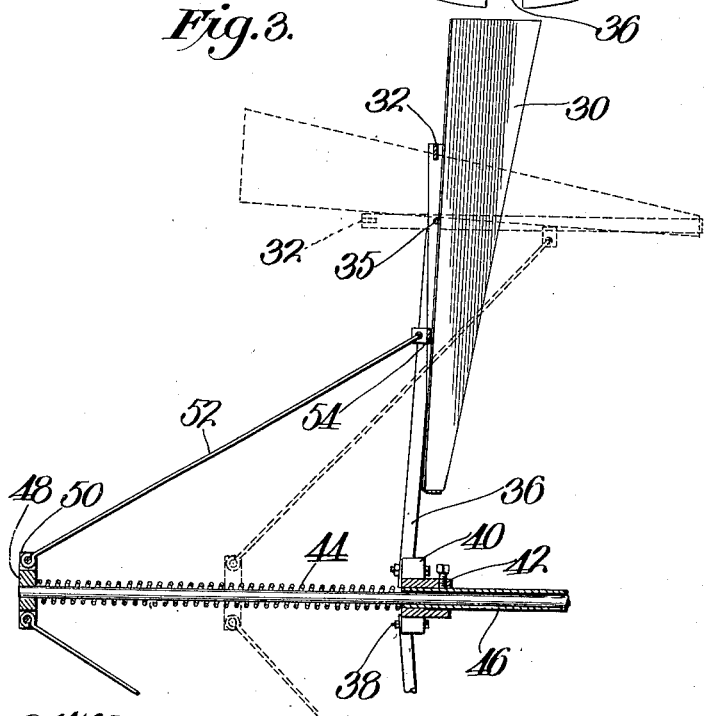

Figure 1, is an elevation of a tower having my improvement applied thereto, the middle portion of the tower being broken away. Fig. 2, is an elevation of the front face of the wind-wheel looking at the same from the left in Fig. 1. Fig. 3, is a section along the wind wheel shaft and showing in elevation two positions of certain of the connections to one of the wind wheel sections. Fig. 4, is a vertical section through the middle of the frame for the windwheel shaft, showing the driving connections and my improvement for oiling the bearings. Fig. 5, is a vertical section through the oil feeding device.

In the drawings, a tower 1 of any suitable construction is provided with upper and lower bearings 2, 3, for a hollow vertical driving shaft 4, having at its lower end a bevel gear 6 meshing with a similar gear 8 on a horizontal shaft 10 on the outer end of which is carried a crank arm 12, for operating the pump connection 14. A sprocket wheel 16 may be conveniently mounted upon the shaft 10 for driving a chain in connection with other work as desired.

The upper end of the shaft 4 extends through the hollow cylindrical lower portion 18 of the bearing frame 20 for the wind wheel shaft 22, the latter being hollow and supported in bearings 24 and 26 of said frame, and having secured thereto a bevel gear 28 meshing with a similar gear 29 carried by the upper end of the shaft 4. The frame 20 is supported by the portion 18 upon the upper face of the bearing 2 for rotary movement about the axis of shaft 4 so as to accommodate the wind wheel to varying wind directions, and one end of the frame is provided with a counter-weight 27 for counter-balancing it against the load at its opposite end where the wind wheel is carried.

The wheel proper is shown as made up of six oscillating sections, each composed of a series of blades 30 mounted upon trapezoidal frames 32. The blades are so dished and mounted as to receive the driving impact of the wind upon their faces which are presented toward the frame 20 and in so mounting them the narrow ends of the blades are secured directly to the inner or short ends of the frame 32 while the wide curved ends of the blades are secured to that face of the outer or long end of the frames 32 which face the frame 20, by means of brackets 34 having curved supporting portions to which the blades are fastened and straight strut portions standing at right angles to the frame 32, both ends of each bracket being secured to said frame. Each frame 32 is pivoted upon a rod 35 carried at its opposite ends upon the outer ends of spokes 36, extending radially from and attached rigidly at their inner ends to the free end of shaft 22 by means of bolts 38 securing them to lugs 40 of a collar 42 secured to said shaft. The rods 35 so divide the pressure area of the sections that the greater portion will lie to the outside of the rods or that side formed by the free ends of the blades the result that under extremely heavy wind pressure, such as would be too great for the safe operation of the wheel, the sections will be tilted automatically upon the rods into inoperative position as represented by the dotted lines in Fig. 3. I also provide means for throwing the sections into inoperative position whenever desired under ordinary wind pressure, as will presently appear.

For holding the blade sections yieldingly in their operative position, a spring 44 is provided, mounted on a rod 46 extending slidingly through the shaft 22. The spring 44 bears at one end against the free end of shaft 22 and at its other end against a collar 48 which is fixed to the rod 46. This collar has a plurality of lugs 50 between each pair of which is mounted one end of a link 52, the opposite end of which is pivoted to a bar 54 extending across one of the frames 32 intermediate the rod 34 and the inner end of the frame. The action of the spring 44 thus serves to hold the parts in the position shown by the full lines in Fig. 3, and in order to regulate the action of the spring and cause the parts to move into the dotted line position or some other intermediate position, means to slide the rod 46 is provided in the form of a cord 56 operated from the ground by any suitable means, as a lever 57 and having a course vertically through the shaft 4 and over a pulley 58 mounted on a bracket 60 connected with the frame 20. The upper end of the cord 56 is secured to one end of a rocking arm 64 pivoted to an extension 62 of frame 20, the other end of said arm 64 being joined by a link 66 to the swivel connection 68 attached to the end of the rod 46. It will thus be seen that by merely manipulating the lower end of the cord 56, the position of the sections may be readily regulated and the amount of pressure area thereof exposed to the action of the wind is brought within complete control.

In order that the bearings of the shafts 4 and 22 may be kept thoroughly lubricated, an oiling device is provided which consists of a receiving cylinder 59 near one end of which is an opening 61 through which to charge the cylinder with oil and a piston 63 operated by a screw stem 65 for forcing the oil through the cylinder outlet into a tube 67 which passes entirely through the shaft 4 and enters an oil chamber 69 from which branch oil tubes 70 lead to the several shaft bearings. The lower end of the tube 67 is fitted with a pet cock 72 adjacent the end of the cylinder to prevent any back flow of the oil in the tube when the supply of the cylinder is renewed.

While the preceding description sets forth one embodiment of the features of my invention fulfilling the objects outlined above, it will be apparent that same is susceptible of slight changes and modifications and I reserve the right to such as fall within the scope of the appended claim.

I claim:—

A windmill comprising a hollow vertical shaft, a frame having bearings for said shaft, a hollow horizontal shaft geared to the upper end of said vertical shaft, a second frame having a sleeve supported upon the top of said first frame and journaled on the upper end of said vertical shaft, said second frame having bearings for said horizontal shaft at opposite sides of said vertical shaft, a wind wheel composed of tilting blade sections and mounted on the outer end of said horizontal shaft, a rod mounted slidingly within said horizontal shaft and operatively connected to said blade sections to tilt the same, said second frame having a pair of horizontally projecting arms on the opposite side thereof from said wind wheel, one of said arms carrying a counterweight and the other arm being provided with a lever having its lower end in line with said horizontal shaft and connected therewith, a vertical arm projecting upward from said second frame and carrying a pulley in line with said vertical shaft, and a cord passing through said vertical shaft and around said pulley and connected to the upper end of said lever.

In testimony whereof I affix my signature in presence of two witnesses.

LEWIS A. PAYTON.

Witnesses:
HELEN C. RODGERS,
G. Y. THORPE.